United States Patent
Decke et al.

(10) Patent No.: US 7,860,621 B2
(45) Date of Patent: Dec. 28, 2010

(54) METHOD FOR OPERATING A MOTOR VEHICLE WITH A LARGE NUMBER OF FUNCTION SYSTEMS

(75) Inventors: Ralf Decke, Unterhaching (DE); Frank Althoff, Munich (DE); Karl Strenzl, Germering (DE); Klaus Ries, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 39 days.

(21) Appl. No.: 11/937,919

(22) Filed: Nov. 9, 2007

(65) Prior Publication Data

US 2008/0125937 A1    May 29, 2008

Related U.S. Application Data

(63) Continuation of application No. PCT/EP2005/005064, filed on May 11, 2005.

(51) Int. Cl.
*B60R 21/01* (2006.01)
*B60R 16/037* (2006.01)

(52) U.S. Cl. .............................. 701/36; 701/45; 701/49; 340/438

(58) Field of Classification Search ................ 701/36
See application file for complete search history.

(56) References Cited

U.S. PATENT DOCUMENTS

| | | | |
|---|---|---|---|
| 6,266,589 B1 * | 7/2001 | Boies et al. ................... 701/36 |
| 7,016,986 B2 | 3/2006 | Fasolt | |
| 7,039,511 B1 | 5/2006 | Kreuz et al. | |
| 7,188,016 B2 | 3/2007 | Flores et al. | |
| 7,391,305 B2 * | 6/2008 | Knoll et al. ................... 340/438 |
| 7,454,545 B2 * | 11/2008 | Kohno et al. .................. 710/72 |
| 2002/0082771 A1 * | 6/2002 | Anderson .................... 701/209 |
| 2002/0092690 A1 * | 7/2002 | Benz et al. ................... 180/167 |

(Continued)

FOREIGN PATENT DOCUMENTS

DE    199 26 206 A1    1/2001

(Continued)

OTHER PUBLICATIONS

PCT/IB/338 and PCT/ISA/237(Translation of the Written Opinion of the International Searching Authority) (Nine (9) pages).

(Continued)

*Primary Examiner*—Thomas G Black
*Assistant Examiner*—Shelley Chen
(74) *Attorney, Agent, or Firm*—Crowell & Moring LLP

(57) ABSTRACT

A method for operating a motor vehicle having multiple functional systems is provided, in which a set of profile specifications is stored in a storage medium of the motor vehicle, and the at least one functional system is configured in accordance with this set of profile specifications. A set of rule specifications is stored in a storage medium of the motor vehicle. The set of profile specifications is fed to a rule analysis unit as input data, the rule analysis unit analyzing the profile specifications on the basis of the set of rule specifications. The configuration of the at least one functional system is performed on the basis of the result of the analysis.

22 Claims, 2 Drawing Sheets

U.S. PATENT DOCUMENTS

| | | | |
|---|---|---|---|
| 2003/0149514 A1* | 8/2003 | Hessling et al. | 701/1 |
| 2004/0010358 A1* | 1/2004 | Oesterling et al. | 701/49 |
| 2004/0034637 A1* | 2/2004 | Riche et al. | 707/9 |
| 2004/0044454 A1* | 3/2004 | Ross et al. | 701/33 |
| 2005/0210387 A1* | 9/2005 | Alagappan et al. | 715/700 |
| 2005/0237150 A1 | 10/2005 | Sun et al. | |
| 2005/0273255 A1* | 12/2005 | Watkins et al. | 701/210 |
| 2007/0027583 A1* | 2/2007 | Tamir et al. | 701/1 |
| 2007/0093958 A1* | 4/2007 | Jonsson et al. | 701/211 |
| 2008/0306652 A1* | 12/2008 | Boger et al. | 701/36 |

FOREIGN PATENT DOCUMENTS

| | | |
|---|---|---|
| DE | 100 15 114 A1 | 10/2001 |
| DE | 101 03 044 A1 | 7/2002 |
| DE | 101 34 717 A1 | 2/2003 |
| DE | 103 40 184 A1 | 7/2004 |
| DE | 103 29 523 A1 | 2/2005 |
| DE | 103 45 746 A1 | 4/2005 |
| EP | 0 626 527 B1 | 11/1994 |
| EP | 1 316 478 A2 | 6/2003 |

OTHER PUBLICATIONS

International Search Report dated Jan. 23, 2006 with English translation of relevant portion (Six (6) pages).

* cited by examiner

METHOD FOR OPERATING A MOTOR VEHICLE WITH A LARGE NUMBER OF FUNCTION SYSTEMS

CROSS REFERENCE TO RELATED APPLICATIONS

This application is a continuation of PCT International Application No. PCT/EP2005/005064, filed May 11, 2005, the entire disclosure of which is herein expressly incorporated by reference.

BACKGROUND AND SUMMARY OF THE INVENTION

The present invention relates to a method for operating a motor vehicle having multiple functional systems, in which a set of profile specifications is stored in a storage medium of the motor vehicle, and at least one functional system is configured corresponding to this set of profile specifications.

Many vehicle functions may be configured in regard to individuals and vehicles in current motor vehicles. Such vehicle functions include functions relating to the comfort of the user, such as the setting of an electrically adjustable seat, radio settings (such as the last transmitter heard and the selected tone settings), settings of the central locking and the outside mirrors, etc. A configuration may also be provided for different countries in this case. The configuration in regard to individuals and vehicles is performed by providing corresponding bit patterns in a memory of the vehicle and/or a key or chip card assigned to an individual. The bit patterns are read out upon starting the vehicle and/or during operation of the vehicle and are used as a decision criterion for activating and/or configuring and parameterizing the vehicle systems.

Providing bit patterns requires that all configuration variants of a functional system must be considered in a decision logic. The decision logic represents a program for analyzing the bit patterns. With an increasing number of functional systems and an increasing personalization of these functional systems as well as the addition of country variants, this results in a large rise of the complexity of the decision logic and the memory space required for this purpose. A further disadvantage is that the configuration using bit patterns solely allows simple binary decisions corresponding to the provided decision pattern, but continuous adaptation of a functional system is not practical.

A method for configuring an information system in a mode of transport is known from German patent document DE 101 34 717 C2. A set of input/output specifications is stored in a storage medium of the information system therein. Output medium, input medium, and/or input/output processes of the information system are configured in accordance with this set of input/output specifications. To make it easier to retrofit components on the information system, a component input/output specification of the additional component is integrated in the output medium, the input medium, and the input/output processes. The input/output specifications are provided in a generic format, such as XML. The operation and output of information of this information system are controlled via the set of input/output specifications and are thus individually adaptable to the usage situation of the information system.

A further system for operating a vehicle having multiple vehicle systems is known from German patent document DE 103 29 523 A1. The output signals of the driving systems are fed to a coordinator. The coordinator generates control signals for activating actuators from the output signals fed thereto. A selection unit connected to the coordinator is used for influencing the coordination of the output signals generated in the driving systems, which is performed in the coordinator to generate the control signals. The selection unit includes a recognition unit, which, on the basis of the driving behavior of the driver, decides on settings which are fed to the coordinator as presets, after which the coordinator performs the generation of the control signals as a function of these presets. The behavior of the coordinator is thus adaptively tailored to the driving behavior of the driver. Operating element actuations and their actuating speeds or their actuating intensity may be detected and analyzed during the driving operation. The operating elements include the operating pedals of the vehicle (i.e., the gas pedal and/or the brake pedal and/or the clutch pedal) as well as the steering handling.

Furthermore, storing driver-specific parameters in a key assigned to the motor vehicle, so that a control unit may perform the driver-specific settings within the motor vehicle before the driver enters the motor vehicle, is known from German patent document DE 103 40 184 A1. The set parameters of the motor vehicle particularly relate to the setting of the seat and/or the setting of a mirror and/or a selection of transmitters stored in a broadcast radio receiver and/or acoustic settings of a music playback device and/or parameters which influence the response behavior of the engine to control actions of the driver.

German patent document DE 199 26 206 A1 describes a configuration system for the automated configuration of vehicle-electrical installations, which at least partially includes hardware components connected to a data bus network and software components for executing associated functionalities implemented in at least a part thereof. The configuration system relates in particular to the process of production of the vehicle in this case. A central actual configuration data memory situated in the vehicle is provided in this configuration system for the retrievable storage of an actual configuration dataset characterizing the actual configuration of the particular vehicle-electrical installation. The memory has a communication connection directly or indirectly to all hardware components. The actual configuration data is stored in the actual configuration data memory in an XML file format. In addition, data about the selected structure and/or grammar of this file format is stored in an assigned document type definition file.

It is an object of the present invention to specify a method for operating a motor vehicle having multiple functional systems, which allows the configuration of the functional systems of the motor vehicle in a simple way.

This and other objects and advantages are achieved according to the present invention by a method for operating a motor vehicle having multiple functional systems, in which a set of profile specifications is stored in a storage medium of the motor vehicle, and at least one functional system is configured in accordance with this set of profile specifications. A set of rule specifications is stored in a storage medium of the motor vehicle. The set of profile specifications is fed to a rule analysis unit as input data, the rule analysis unit analyzing the profile specifications on the basis of the set of rule specifications. The at least one functional system is configured on the basis of the result of the analysis.

In the scope of the present invention, all components or functions of a motor vehicle controllable via software components are viewed as functional systems. These may be driving systems, such as warning systems or driver assistance systems. Warning systems are, for example, a tire pressure monitoring system or a hazardous location warning unit for curves or intersections. The driver assistance systems include a braking assistant, a stability monitor, an automatic velocity and/or distance regulator, and/or a yaw rate regulator. Functional systems are also all types of comfort systems and information systems, such as an infotainment display for showing navigation information, audio/video data, statistical data on distance and consumption, or telecommunications services. The comfort systems include, for example, the settings of the internal and external mirrors, the setting of the seats, settings of an audio device in regard to the last transmitter heard, the last data source heard, and the acoustic settings as well as settings of the air-conditioning system. In addition, many further systems are possible.

The set of profile specifications contains general information about the user and the vehicle, in particular about the version, about selection possibilities, the type and way of operation, and the input and output media available and the possible communication and interaction processes for a particular functional system. For example, it is reflected in the profile specifications which menu tree is provided, whether speech input or output is possible, whether a graphic display and which type of display is provided, or whether operation is to occur via buttons. Conditions may be fixed in the profile specifications, under which conditions data input and/or output is possible or whether or not a functional system is to be provided to a user of the motor vehicle. It may also be specified by the specifications that, although function buttons are available on an input medium, e.g., only speech operation is allowed. The version specification is provided for documentation and testing purposes.

Instead of providing the possible configuration variants hard-coded in a vehicle, i.e., in the form of unchangeable software, the present invention suggests that all data needed for a configuration be provided in the form of profile specifications. The profile specifications are analyzed on the basis of rule specifications. Because both profile specifications and also rule specifications are changeable easily, the possibility of simple, individual configuration results, which on one hand simplifies the processes during the production of the vehicle and, on the other hand, easily allows adaptation of the vehicle to modes of behavior of the user.

According to an exemplary embodiment, the set of profile specifications and the set of rule specifications are stored in a generic format, and data about its structure is stored in an assigned document type definition file. The so-called XML (extensible mark-up language) file format suggests itself as the generic format, which was published by the W3C (World Wide Web Consortium) and represents a subset of SGML (standard generalized mark-up language). The documents are stored hierarchically and are machine readable and interpretable. Thus, for example, tree structures may be stored and their contents interpreted by microcomputers. Tags are used for separating and identifying data fields and help to implement the data as self-descriptive. The structure and/or grammar information of the file may be defined together with the profile specifications stored in XML format in a definition file, which is stored together with the XML file or XML files in the storage medium of the motor vehicle. This guarantees consistent, i.e., relevant profile specification documentation even after years, using not only permanent interpretation of the profile specifications, but rather also their modification remains possible.

The set of profile specifications includes both first and also second profile specifications, the configuration of the at least one functional system being performed in consideration of the first and second profile specifications. The first profile specifications contain information, i.e., information about which settings, states, and/or state changes a functional system may assume in operation. This means that the technical behavior of a functional system is imaged in the first profile specifications.

It is possible to situate information about multiple functional systems in one profile specification. A separate profile specification is expediently maintained for each functional system of the motor vehicle, by which better flexibility and overview is provided in case of changes to the profile specifications.

In contrast, the second profile specifications relate to user-specific information in regard to preferred settings of at least one of the functional systems of the vehicle user. For example, it is stored in the second profile specifications which radio transmitters a user has last set, which position the seat, mirrors, and the like were in, whether the user has selected a sporty or comfortable driving program, etc. The second profile specifications thus contain the information on the basis of which a driver-specific configuration of the at least one functional system may be performed. The second profile specifications thus represent a partial detail of the first profile specifications, so that for the configuration the contents of the first profile specifications corresponding to a second profile specification and possibly existing conditions are selected to perform the configuration of a functional system.

According to another exemplary embodiment, the second profile specifications are tailored adaptively to the behavior of the user. In this way, it is possible to tailor a motor vehicle to the requirements of the user and to the particular situation at the runtime. The adaptivity not only comprises the detection of the last changes performed on the settings and/or states, but rather may also consider environmental conditions, such as day or night, snow or rain, vehicle velocity, traffic density, etc. In particular, it is possible to tailor the vehicle systems influencing the vehicle dynamics to the driving habits and the driving style of the user.

For this purpose, the settings, states, and/or state changes of particular functional systems performed by the user are recorded by a recording component for the adaptive tailoring of the second profile specifications. In the event a change of settings, states, and/or state changes is established in relation to the settings, states, and/or state changes stored in the second profile specifications, the profile specifications are tailored, for example. Depending on which functional system a profile specification is assigned to, every established change may be noted directly in the profile specifications. However, it is also conceivable, in particular for those profile specifications which influence the response behavior of the engine, the transmission, or the suspension through actuation of operating elements of the driver, for example, to observe over a longer period of time and, after detecting a trend of the states caused by the user, to conclude desired behavior which the user intends. In particular, actuating intensities and actuating frequencies of the operating elements (gas pedal and/or brake pedal and/or clutch pedal and/or steering handling) during driving operation are observed and recorded. In general, the actuation of all interaction elements by the user may be observed and corresponding changes may be noted in the profile specifications.

Furthermore, the adaptive tailoring of the profile specifications is performed by the rule analysis unit, in that the data recorded by the recording component is fed to the rule analysis unit as input data, which analyzes this data on the basis of the set of rule specifications. While the analysis and change of the profile specifications is performed in the rule analysis unit, the observation of changes on settings, states, and/or state changes is performed by the recording component. Chronological influences on changes of the profile specifications may also be considered. The consideration of the contents of the profile specifications as input variables for the adaptive configuration and/or parameterization of corresponding functional systems is performed in the way already described in the rule analysis unit, which has access to the profile specifications.

The set of profile specifications, i.e., the first and second profile specifications, may be stored in a central storage medium of the motor vehicle. It is also possible to store the set of profile specifications distributed in particular storage media of the functional systems. The profile specifications may also be stored partially or completely on a vehicle key assigned to a user or an access card (chip card). The set of rule specifications may also be stored in the central storage medium. A separate memory may also be provided for the rule specifications.

According to another exemplary embodiment, input medium, output medium, and/or input/output processes are configured by a dialogue component in accordance with the analysis of the profile specifications. Therefore, information may be contained in the profile specifications, about which input or output media are to be used to operate a functional system. The operation may particularly be made a function of further, e.g., environmentally-dependent parameters. Thus, for example, in the event of travel at high velocity, functional systems may only be able to be operated via a speech input/output system. It would also be conceivable to only provide absolutely required functions to the user of the vehicle in a display at high velocity, and to make the access to less relevant functional systems a function of falling below a specific velocity. Information and parameters of this type may be stored in the first profile specifications. If such parameters are settable by the user, they are also contained in a user-specific way in the second profile specifications.

Furthermore, the profile specifications may be tailored on the basis of detected environmental parameters. Detected environmental parameters may be, for example, the current travel vehicle velocity or the current position of the vehicle, which may be ascertained by a GPS transmitter.

Other objects, advantages and novel features of the present invention will become apparent from the following detailed description of the invention when considered in conjunction with the accompanying drawings.

DETAILED DESCRIPTION OF THE DRAWINGS

Figure 1:
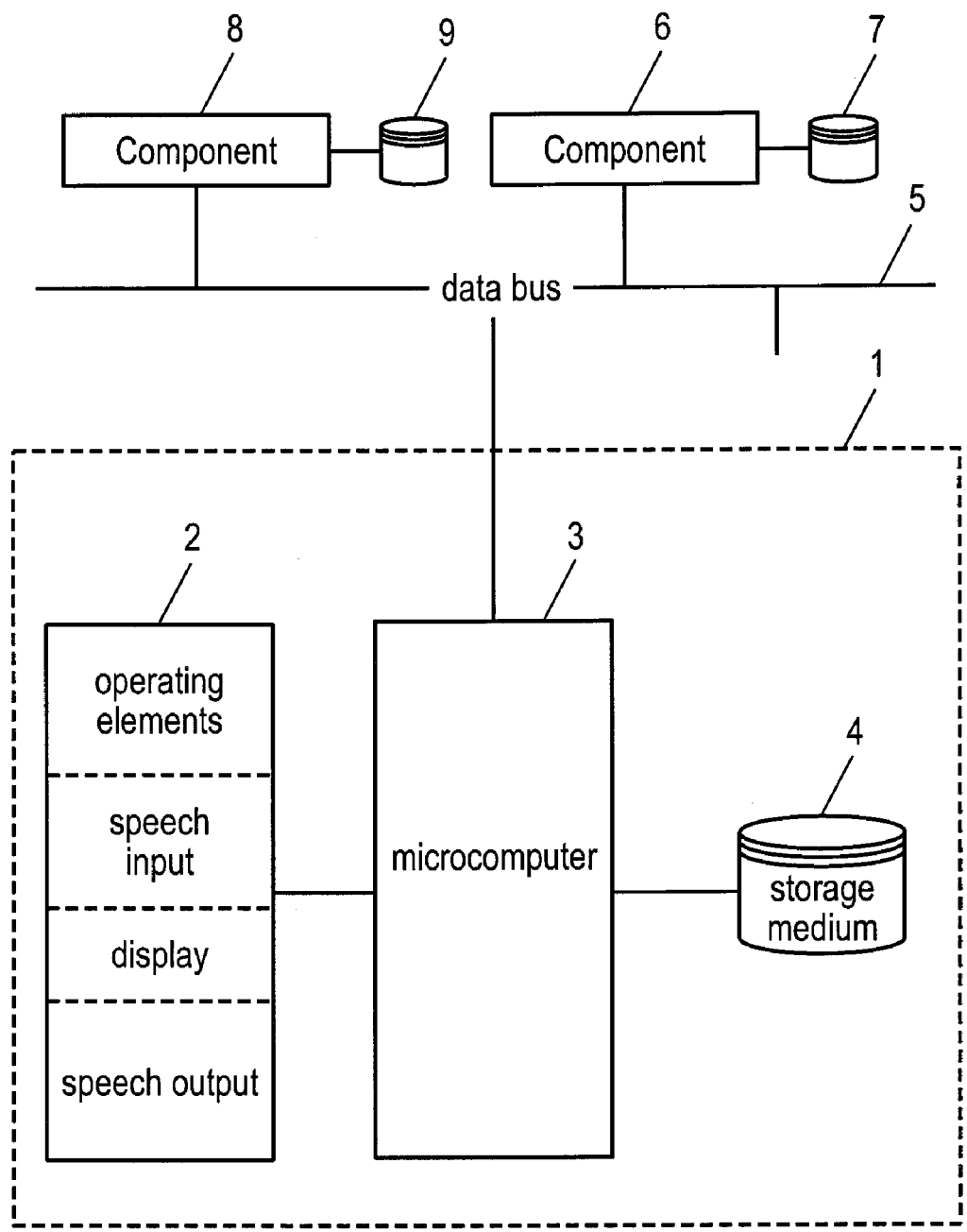
FIG. 1 shows a schematic illustration of a device for performing the method according to the present invention.

In the device shown in connection with FIG. 1, the functional system is implemented for exemplary purposes as an information system. This is solely performed for reasons of viewability, but is in no case to be viewed as restrictive. The functional system may fundamentally represent any component or function in a motor vehicle controllable by software.

The information system 1 in a motor vehicle includes an operating unit 2, a storage medium 4, and a microcomputer 3, which are electrically connected to one another. Components 6, 8 are connected to the information system 1 via a data bus 5. The components 6, 8 may be control units, which represent individual functions or also functional systems of the motor vehicle. The data bus 5 may be implemented as an optical MOST or D2B bus or as an electrical CAN bus. The components 6, 8 are connected via an interface to the data bus 5. In addition, the components 6, 8 each have a storage medium 7, 9 for storing data.

The operating unit 2 contains input and output media of the information system 1, which is composed, for example, of operating elements, speech input/output, and display. The operating elements may be implemented via buttons, a microphone is available for the speech input, the display occurs via a display, and the speech output is performed via loudspeakers, e.g., of the audio system.

The control of the operating unit 2 occurs via the microcomputer 3, which thus assumes the function of a man-machine interaction (MMI) manager. In this function, the microcomputer 3 ensures that the signals incoming via the input medium of the operating unit 2 are relayed to the appropriate components 6, 8 and the feedback from the components 6, 8 is relayed and output correctly to the output media.

The set of profile specifications valid for the information system is stored in the storage medium 4. The storage medium 4 does not necessarily have to be an internal memory of the vehicle, but rather may also be a memory in a key or a smartcard of a user. A rule analysis unit available in the microcomputer 3 analyzes the profile specifications used for configuring the information system 1 while using profile specifications which are also stored in the storage medium 4. It is thus ensured that the units activatable via the information system meet the set of profile specifications. The storage medium 4 is also used for storing log information of the information system. Thus, for example, if a validation of a profile specification is not possible, a message is output to the operating unit 2 and a corresponding data set is stored in the storage medium 4.

In one variant, particular profile specifications of the components 6, 8 may also be stored in the storage media 7 and 9 of the components 6, 8.

Figure 2:
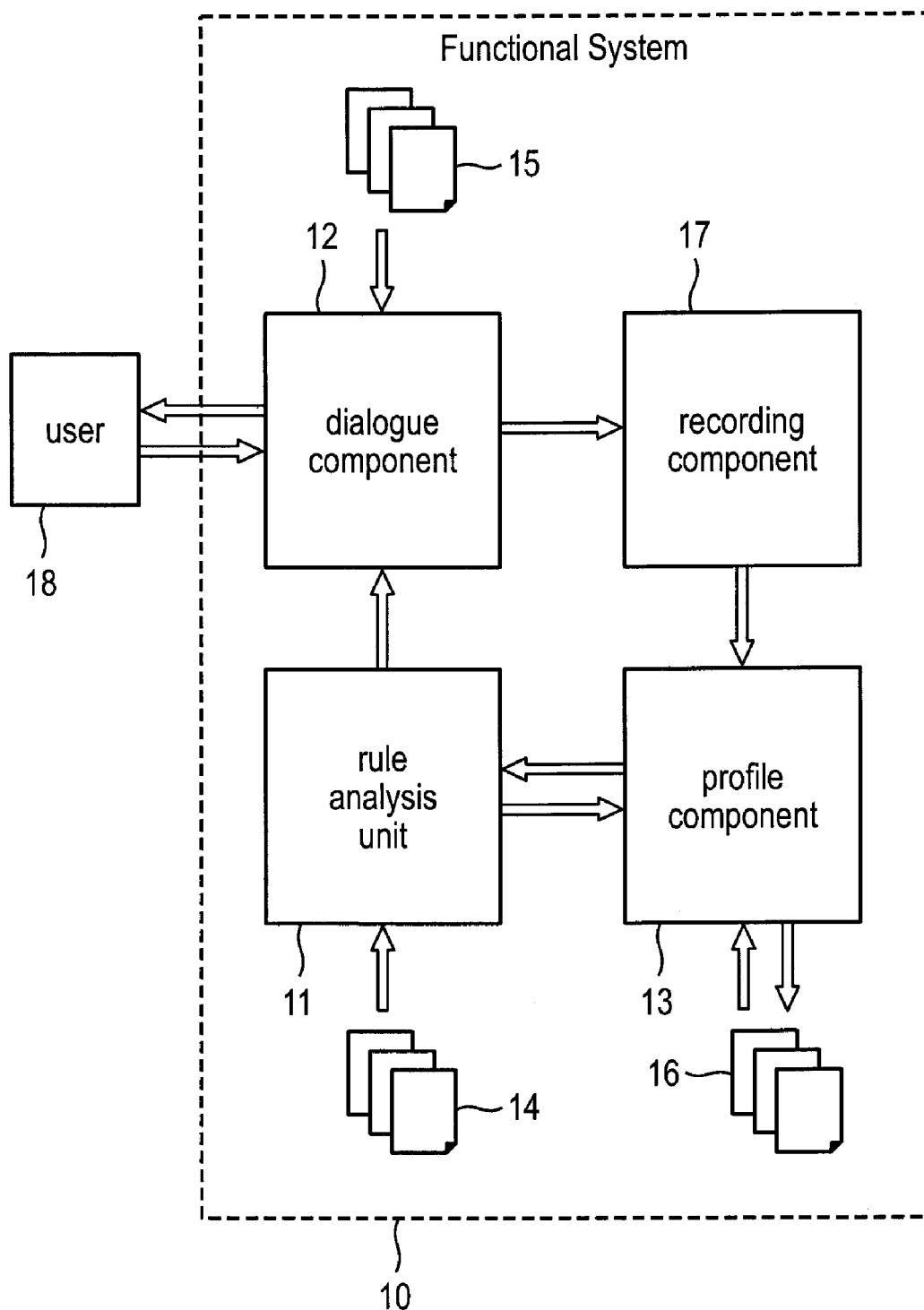
FIG. 2 shows a schematic illustration of the logical components for performing the method according to the present invention.

FIG. 2 shows a schematic illustration of the logical components for performing the method according to the present invention. A functional system 10, which may be formed, for example, by the information system 1 described in FIG. 1, includes a rule analysis unit 11, a dialogue component 12, a profile component 13, and an optional recording component 17.

The functional system 10 includes a set of profile specifications 16, which comprises first profile specifications affecting the vehicle and second profile specifications affecting the user. The set of profile specifications 16 may be read out and interpreted by the profile component 13. The set of profile specifications 16 is fed to the rule analysis unit 11 as input data. The analysis of the set of profile specifications 16 is performed using rule specifications 14, which the rule analysis unit 11 may access. The rule analysis unit 11 is an interpreter for interpreting and analyzing the rule specifications 14 using the set of profile specifications 16 as input data.

Furthermore, further profile specifications 15 may be provided, which may be read out by the dialogue component 12 and contain information in regard to the interaction behavior of the functional components with the user. The further profile specifications may be graphic libraries, for example. The profile specifications 15, 16 and the rule specifications 14 are provided in the form of one or more files in a generic format, e.g., XML. Therefore, simple replacement and simple alteration of the functionality may be performed at the runtime of the vehicle and in case of routine updates of software functionalities of the functional system.

The first profile specifications of the set of profile specifications 16 contain information about which settings, states, and/or state changes a functional component may assume in operation. The first profile specifications in particular contain information about selection possibilities, expansion possibilities, the mode of operation and available input and output media and possible communication and interaction processes for the information system. Which menu tree is available for the functional system is imaged in the first profile specifications, for example. Information is stored as to whether a speech input or output is possible, whether a simple or graphic display is provided, whether buttons are available for operation. The first profile specifications may also contain conditions or parameters in which it is specified, for example, how large the maximum number of displayable entries in a graphic display is as a function of a specific velocity value.

The second profile specifications of the set of profile specifications 16 contain the preferred settings and/or states of a user of a particular functional component.

The information contained in the profile specifications is fed to the rule analysis unit 11 as input variables with the profile component 13 interposed. The rule analysis unit 11 may perform a configuration and optional parameterization of the corresponding functions of the functional system 10 on the basis of the analysis of this information, in that the result of the analysis is fed to the dialogue component 12.

The dialogue component contains the function of the man-machine interaction manager, so that an interaction with a user 18 is possible. In the optional profile specifications 15 assigned to the dialogue component 12, information may be contained about how the configuration conditions are to be implemented for an interaction, for example. Thus, the profile specifications 15 may contain a set of different graphics or types of script, so that the representation of information may be performed in a way desired by the user. The speech model of various voices may be stored, to be able to reproduce information reproduced via the speech output in a specific pitch. This information may, contrary to the illustration of FIG. 2, also be made available in the form of bit patterns in a storage medium and stored therein in a databank.

To be able to track the user behavior of the operation of the functional system and register corresponding preferred settings or state changes, the recording logic 17 is provided, which records the behavior performed by the user during operation of the functional system and feeds it to the rule analysis unit 11 for an evaluation. If the rule analysis unit 11 establishes specific behavior of the user in regard to the operation of the functional system, it may alter and save the corresponding settings and/or state changes in the corresponding profile specifications 16. The observation of the user behavior may thus result in adaptivity of the functional system. The adaptivity may relate, for example, to the type of graphic display of the information in the display in regard to both the content and also the visual type, the settings of the air-conditioning system, the settings of the audio/video system, or of the driving behavior.

It is thus easily possible to perform function changes and function expansions on the functional system. Function changes may be implemented by the appropriate analysis of the information contained in the profile data. Function expansions may be implemented without changes on the functional system. Thus, for example, the preferred travel goals of the user may be ascertained from the profile data. Upon starting the vehicle, a list having these preferred travel goals may be provided to the user, so that the user does not have to perform special programming of his navigation system.

The components of the present invention illustrated in FIG. 2 may each be provided in each functional system of the motor vehicle according to a variant. However, it is also conceivable to situate the logical units distributed over multiple functional systems and to situate the rule analysis unit 11, the dialogue component 12, the profile component 13, and the recording component 17 centrally one time.

The present invention thus describes decoupling of the decision logic from a function logic. The decision logic contains the rule logic, the profile logic, and the optional recording logic. Configuration data of the vehicle and profile data of the user are contained in a set of profile specifications as profile parameters in an abstract, generic format. Examples of the configuration data would be, for example, various country versions of the vehicle, the type of equipment of the vehicle, etc. User profile data may represent the age of the user, the type of driver (sporty or comfort-oriented), frequently used functions, vehicle usage (business or private or mixed), knowledge level of the user (beginner or normal or expert).

The profile specifications may be continuously tailored as needed by the recording logic, on one hand to the user and on the other hand to the particular environmental situation of the vehicle.

The rule logic may be parameterized via the profile specifications. The regulator uses the set of the profile specifications as an input variable and configured and/or parameterized as the corresponding vehicle functions on the basis of generic rule specifications. Thus, for example, an incoming call may be suppressed if the vehicle velocity is above a defined threshold value and a call arrives. If the motor vehicle contains a "sport package" as individual equipment, information may be shown in the display in a "sporty" graphic tailored thereto.

In the dialogue logic, which represents the above-mentioned function logic, only the parameters for influencing the functional system are provided. The dialogue logic does not contain any information about the decision tree and the procedure upon making the decision, however.

One advantage of the procedure according to the present invention is that various configuration and parameterization variants may be changed at the runtime, i.e., dynamically, by changing the descriptions of the profile specifications. The alteration may be performed by editing or reloading a current description of the profile specifications. The special advantage is that providing corresponding variants of decision trees and rules may be dispensed with. Therefore, it is finally possible to continuously adapt a functional system to the user and the particular situation at the runtime. For example, an MMI system may be tailored to the knowledge level of the user and/or its strain because of the driving situation by changing the display, the interaction or dialogue logic, and the available functional scope as well as the help offered. Parallel thereto, the functional system may be continuously tailored to the driving situation and the vehicle environment (e.g., freeway or city, weather). Furthermore, individualization and customer-specific tailoring, in particular of the MMI, to the individual equipment ordered by the user are made possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a motor vehicle having multiple functional systems, in which a set of profile specifications is stored in a storage medium of the motor vehicle, and at least one functional system is configured corresponding to the set of profile specifications, wherein
a set of rule specifications is stored in a storage medium of the motor vehicle,
the set of profile specifications is fed to a rule analysis unit as input data, the rule analysis unit analyzing the profile specifications based on the set of rule specifications,
configuration of the at least one functional system, including a warning system, a driving assist system and a driver comfort system, is performed based on a result of the analyzing;
behavior of a user of the motor vehicle is recorded by a recording unit and evaluated by the rule analysis unit during operation of the at least one functional system;
the at least one functional system is continuously adapted to the behavior of the user, including changing at least one of content and visual type of a graphic display of information and settings of an audio/video system;
the set of profile specifications and the set of rule specifications are stored in a generic format and data about their structure is stored in an assigned document type definition file; and
controls for essential functional systems are made available in a display to a user and controls for non-essential functional systems are made available in the display to the user only when the motor vehicle is below a predetermined vehicle speed.

2. The method according to claim 1, wherein the set of profile specifications comprises first and second profile specifications, information about the functional systems being contained in the first profile specifications and user-specific data in regard to the at least one functional system of the motor vehicle being contained in the second profile specifications, and the configuration of the at least one functional system being performed in consideration of the first and second profile specifications.

3. The method according to claim 2, wherein the first profile specifications contain information about at least one of settings, states, and state changes the at least one functional system may assume in an operation.

4. The method according to claim 2, wherein the second profile specifications contain information about at least one of preferred settings and states of the at least one functional system.

5. The method according to claim 1, wherein the set of profile specifications is tailored adaptively to the behavior of a user.

6. The method according to claim 5, wherein at least one of the settings, states, and state changes of the at least one functional system performed by the user are recorded by a recording component for the adaptive tailoring of the profile specifications.

7. The method according to claim 6, wherein the adaptive tailoring of the profile specifications is performed by the rule analysis unit, such that the data recorded by the recording component is fed to the rule analysis unit as input data, the rule analysis unit analyzing the data on the basis of the set of rule specifications.

8. The method according to claim 1, wherein at least one set of rule specifications and one set of profile specifications are assigned to each functional system.

9. The method according to claim 1, wherein at least one of input medium, output medium, and input/output process are configured by a dialogue component in accordance with the analysis of the profile specifications.

10. The method according to claim 1, wherein the profile specifications are tailored on the basis of detected environmental parameters.

11. A method for operating a motor vehicle having multiple functional systems, in which a set of profile specifications is stored in a storage medium of the motor vehicle, and at least one functional system is configured corresponding to the set of profile specifications, comprising the acts of:
storing a set of rule specifications in a storage medium of the motor vehicle;
inputting the set of profile specifications to a rule analysis unit;
analyzing, in the rule analysis unit, the profile specifications, based on the set of rule specifications;
configuring the at least one functional system, including a warning system, a driving assist system and a driver comfort system, based on a result of the analyzing act;
recording and evaluating behavior of a user of the motor vehicle during operation of the at least one functional system; and
continuously adapting the at least one functional system to the behavior of the user, including changing at least one of content and visual type of a graphic display of information and settings of an audio/video system;
wherein the set of profile specifications and the set of rule specifications are stored in a generic format and data about their structure is stored in an assigned document type definition file,
wherein controls for essential functional systems are made available in a display to a user and controls for non-essential functional systems are made available in the display to the user only when the motor vehicle is below a predetermined vehicle speed.

12. The method according to claim 11, wherein the set of profile specifications comprises first and second profile specifications, information about the functional systems being contained in the first profile specifications and user-specific data in regard to the at least one functional system of the motor vehicle being contained in the second profile specifications, and the configuration of the at least one functional system being performed in consideration of the first and second profile specifications.

13. The method according to claim 12, wherein the first profile specifications contain information about at least one of settings, states, and state changes the at least one functional system may assume in an operation.

14. The method according to claim 12, wherein the second profile specifications contain information about at least one of preferred settings and states of the at least one functional system.

15. The method according to claim 11, wherein the set of profile specifications is tailored adaptively to the behavior of a user.

16. The method according to claim 15, wherein at least one of the settings, states, and state changes of the at least one functional system performed by the user are recorded by a recording component for the adaptive tailoring of the profile specifications.

17. The method according to claim 11, wherein the set of profile specifications comprises first and second profile specifications, information about the functional systems being contained in the first profile specifications and user-specific data in regard to the at least one functional system of the motor vehicle being contained in the second profile specifications, and the configuration of the at least one functional system being performed in consideration of the first and second profile specifications.

18. The method according to claim 13, wherein the second profile specifications contain information about at least one of preferred settings and states of the at least one functional system.

19. The method according to claim 1, wherein the warning system includes at least one of a tire pressure monitoring system and a hazardous location warning unit, the driving assist system includes at least one of braking assistant, a stability monitor and an automatic distance regulator, and the driver comfort system includes at least one of mirrors, seats and an air-conditioning system.

20. The method according to claim 11, wherein the warning system includes at least one of a tire pressure monitoring system and a hazardous location warning unit, the driving assist system includes at least one of braking assistant, a stability monitor and an automatic distance regulator, and the driver comfort system includes at least one of mirrors, seats and an air-conditioning system.

21. The method according to claim 1, further comprising the acts of:
- determining that a validation of a first profile specification is not possible; and
- outputting a message to an operating unit that the validation of the first profile specification is not possible.

22. The method according to claim 11, further comprising the acts of:
- determining that a validation of a first profile specification is not possible; and
- outputting a message to an operating unit that the validation of the first profile specification is not possible.

* * * * *